April 16, 1940.   H. C. MACK   2,197,664
FOOT VALVE CONTROL FOR AUTOMOBILE BRAKES
Filed July 7, 1936   2 Sheets-Sheet 1
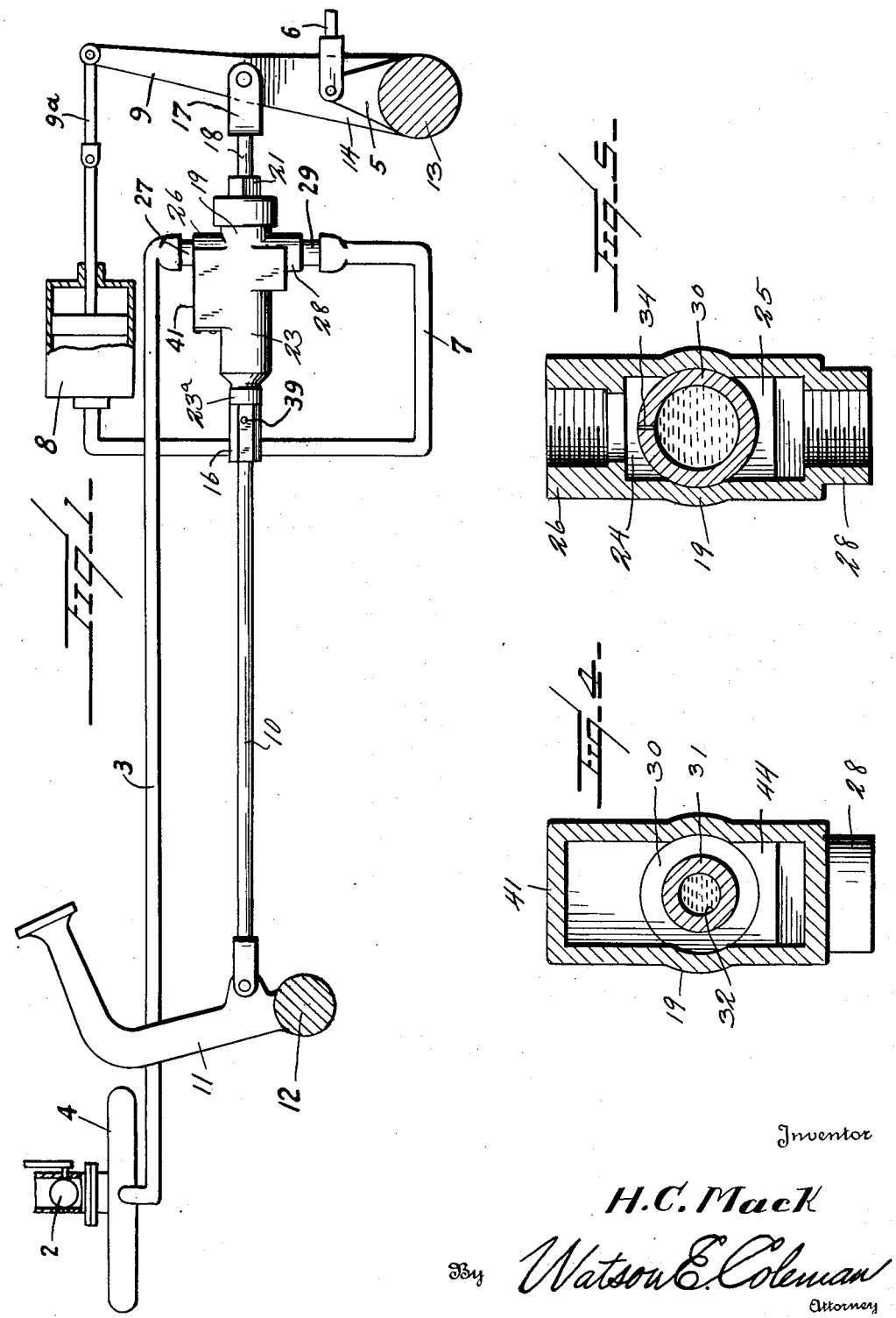
Inventor
H. C. Mack
By Watson E. Coleman
Attorney

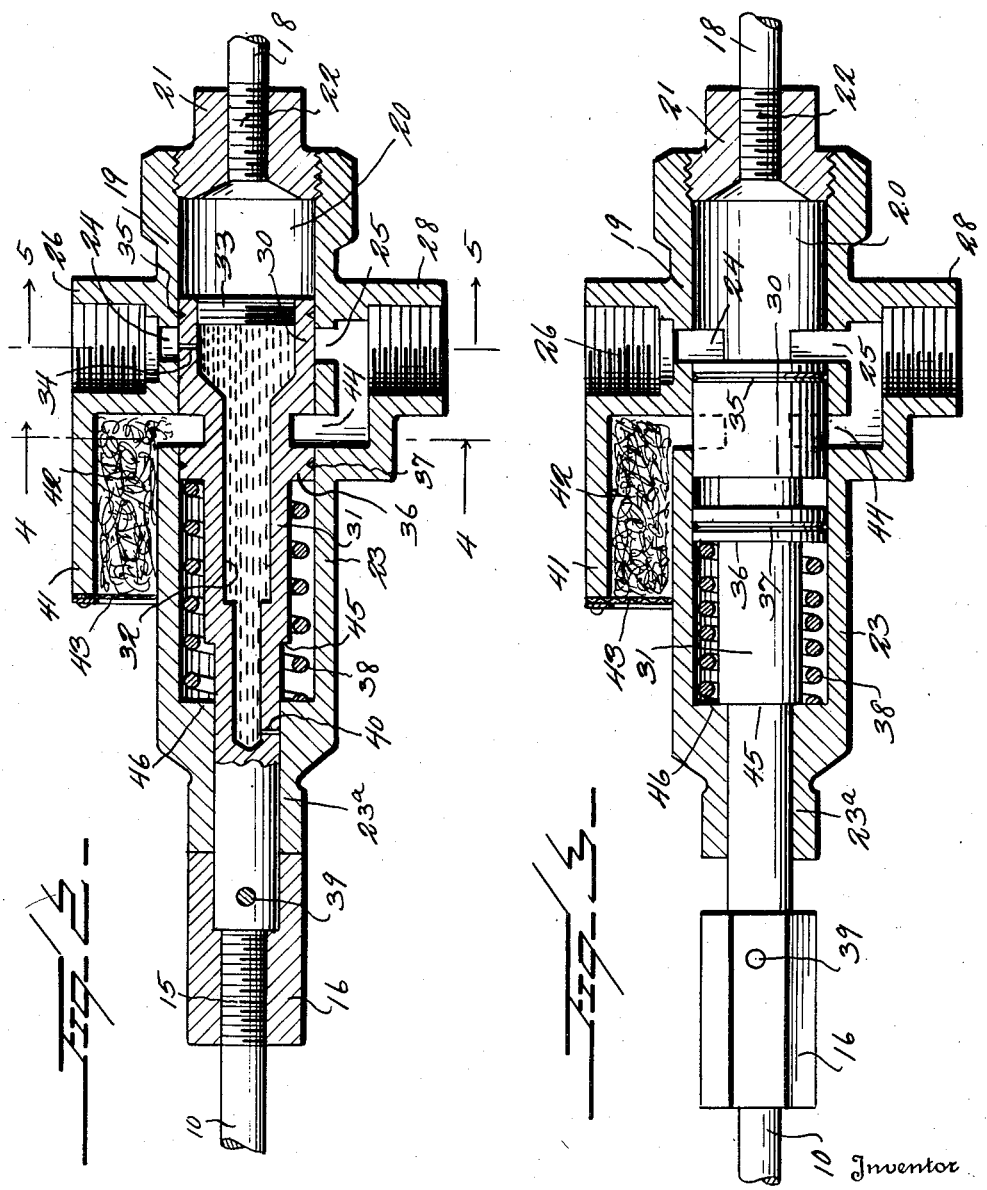

Patented Apr. 16, 1940

2,197,664

UNITED STATES PATENT OFFICE 2,197,664

FOOT VALVE CONTROL FOR AUTOMOBILE BRAKES

Harley C. Mack, Joplin, Mo.

Application July 7, 1936, Serial No. 89,406

2 Claims. (Cl. 121—46.5)

This invention relates to control means for automobile brakes and particularly to manually operable means for controlling the application of vacuum or air brakes.

The general object of the invention is to provide a valve disposed in the vacuum or air line extending from a power chamber to the air brake mechanism and to a source of vacuum as, for instance, the intake of the automobile engine, which valve is so connected to a pedal that when the pedal is pushed forward, the valve will be caused to open to an extent depending upon the degree to which the pedal has been moved, the opening of the valve establishing communication between the brake mechanism and the source of vacuum.

Other objects are to secure simplicity of design and to make the brake mechanism universal in its adaptation to all makes and models of cars or trucks having air brake mechanism, and to provide for the connection of the valve to the brake pedal rod of all brakes.

A further object and one of the most important, is to so construct my mechanism that its use will not destroy the manual application of the brakes when the motor is dead.

A further object is to provide a construction which is particularly light in weight and in which the cross shaft carries the greater portion of the weight of the valve and valve casing, and thus eliminates the weight of most vacuum controlled valves which are obliged to be mounted almost midway of the brake pedal rod.

A still further object is to provide a structure of this character in which all intricate working parts have been eliminated or reduced to a minimum so that inexperienced persons can install my mechanism without having to take the mechanism apart or make any adjustment therein.

Still another object is to provide a specially designed piston valve which is loaded with a prepared lubricant, thus preventing wear and forming a packing ring to prohibit muddy water or sandy water from entering between the piston valve and the cylinder wall.

Other objects will appear in the course of the following description.

My invention is illustrated in the accompanying drawings wherein:

Figure 1 is a side elevation of my mechanism in applied position on a brake operating rod, the shaft of the brake pedal and the brake shaft being shown in section, this figure showing diagrammatically the connections to the pneumatic brake controller and to the manifold;

Figure 2 is an enlarged longitudinal section through my foot valve control showing the mechanism in the brake release position;

Figure 3 is a like view to Figure 2 but showing the mechanism in the brake applying position;

Figure 4 is a section on the line 4—4 of Figure 2;

Figure 5 is a section on the line 5—5 of Figure 2.

Referring to the drawings, 10 designates the usual brake rod of an automobile connected to the brake pedal 11 which is mounted upon the brake pedal shaft 12. 13 designates the brake applying shaft which is so connected to the braking mechanism that when the shaft is rotated in a counterclockwise direction or forward by a depression of the brake pedal, the brakes will be applied in the ordinary manner and when it is permitted to move rearward, the brakes will be released.

The shaft 13 carries the arm 14. As shown diagrammatically in Figure 1, the shaft 13 also carries an arm 5 to which is connected a rod 6 which runs to the usual brake equalizer mechanism, not shown, and which is connected to the brake shoes.

The rear end of the brake rod 10 is shown as screw threaded at 15 and as carrying upon it the collar 16. The arm 14 is connected by a clevis 17 to a brake rod section 18. Disposed between the brake rod section 10 and the section 18 is a valve casing designated generally 19 having a centrally disposed cylindrical chamber 20. The rear end of this cylindrical chamber is closed by a screw threaded plug 21 into which the brake rod section 18 is screw threaded at 22. The valve casing 19 is extended forward to provide a cylindrical extension 23 of the chamber 20 which normally, when the brake is off, abuts against the collar 16 as shown in Figures 1 and 2. The valve casing at diametrically opposite points is provided with two ports 24 and 25. The vacuum port 24 leads directly into the interior of the cylinder 20 and at its outer end opens into a hub 26 which is screw threaded for attachment to a hose nipple designated 27 in Figure 1 and which is operatively connected to a rubber hose 3 leading in turn to the intake manifold 4 between the intake ports of the engine and the choke valve or butterfly valve 2. The suction port 25 opens into a hub 28 which in turn is screw threaded for operative engagement with the hose nipple 29 which connects with the flexible hose 7 which in turn connects with the power chamber 8 within which operates a piston connected by a rod 9ª to an arm 9 on shaft 13. When the air is exhausted from the left hand end of this power cylinder or chamber 8, the piston will be drawn toward the left in Figure 1, which will apply the brakes.

Operating within the cylinder 20 is a valve, the head of which is designed 30. This head is hollow and communicates with the hollow stem 31 which extends through the portion 23 concentrically thereto. This portion 23 at its outer end is formed with a neck 23ª which closely surrounds the stem 31. The hollow head and the bore 32 in the valve stem constitutes a reservoir for lubricant. This bore is closed at the head end of the piston valve by means of the screw threaded plug 33. The head of the piston valve is provided with a lubricating port 34 and with grooves 35. The stem is formed with an annular flange 36 which fits within the extension 23 of the valve casing, and this flange 36 is provided with an annular groove 37. Surrounding the stem and disposed within the extension 23 of the valve casing is a compression spring 38 which bears at one end against the flange 36 and at its other end against the end wall of the portion 23 and forces the valve toward the rear. The stem portion 23ª is engaged with the screw threaded end of the brake rod 10 and is pinned thereto at 39. The bore 32 is provided with an opening 40 which discharges oil against the inner face of the portion 23ª. The bore or chamber 32 is designed to contain a special heavy lubricant such as a mixture of graphite and grease for the purpose of keeping the piston valve and its stem lubricated at all times.

Forming part of the valve casing is a chamber constituting an air duct, the wall of which is designated 41, this chamber being filled with material 42 which acts as a filter for air. The forward end of this chamber is open but extended across the open end of the chamber is a wire netting 43 holding the material 42 in place. An arcuate groove 44 is formed, as shown in Figure 3, between the flange 37 and the head of the valve and this arcuate groove, when the parts are in the position shown in Figure 2, communicates with the interior of the chamber 41 and with the interior of the valve casing on the outlet side thereof, as shown in Figure 2. When the valve is opened, as shown in Figure 3, the suction of the engine will draw air across the valve chamber through the ports 24 and 26, and this will apply the brakes. When the valve is closed, however, in the position shown in Figure 2, there will be no communication between the ports 24 and 25, but communication will be established between the brake actuating mechanism and the chamber 41, so that air may enter to break the vacuum in the power chamber 8 of the brake system, but this air is filtered by the filtering material 43.

The spring 38 takes a pull of approximately 90 pounds in order to compress the spring, which amounts to about 10 pounds of foot pressure on the brake 11 before power from the manifold is admitted to the power cylinder of the brake. It is to be particularly noted with this construction that if the engine be dead and it be desired to put on the brake, that as soon as the shoulder 45 (Figure 2) formed on the stem 31 strikes the end wall 46 of the cylindrical portion 23, the pull on the brake rod 10 is transmitted directly to the portion 23 and to the valve casing which is formed therewith and thus transmitted directly to the rod 18 and thus to the brake lever 14 and the shaft 13, so that the brakes may be manually applied. Thus my construction will permit brake application with a dead motor.

The lubricant contained within the interior of the valve and stem feeds through the small ports 34 and 40 and is distributed along the cylinder wall, thus filling the V-shaped grooves 35 and 37. This not only prevents wear but forms a packing ring, preventing muddy water or sandy water from entering the cylindrical chamber 20 and this adds greatly to the utility of my construction.

It is to be noted that the valve casing is disposed very closely adjacent the lever 14 so that the cross shaft 13 supports the greater portion of the weight of this valve casing. This is unlike most vacuum controlled valves which are mounted almost midway of the brake pedal rods and thus tend to cause these brake pedal rods to sag.

The main body of the valve will preferably consist of aluminum while the piston will be of steel and ground on the outside to form a leakproof joint at all ports. The piston, after completion and just before assembling is loaded with a specially prepared lubricant of a heavy quality such, for instance, as a mixture of grease and graphite which will not be injurious to the rubber hose extending from the nipples 27 and 29. The valve setting is permanent and the collar 16 forms a stop for the valve in released position. This foot control valve has many advantages over valves of the same general character now in use. It is simple in construction and requires only a minimum amount of skill to install it. Its position closely adjacent to the arm 14 and cross shaft 13 and the relative lightness of the valve casing eliminates vibration of the foot pedal rod or reduces it to a minimum. The construction is such as to prevent any necessity of adjustment whatsoever during the life of the mechanism. The specially designed piston loaded with lubricant and ported for lubrication at two points prevents both wear and leakage of muddy or sandy water into the contacting parts of the valve and valve casing.

It is to be particularly noted that in my construction the valve casing 23 is supported very closely adjacent to the arm 14. It is, therefore, not subjected to severe vibrations when the vehicle is in motion. My valve casing and valve forms a direct part of the brake pedal rod and the location of the mounting very closely adjacent to the arm 14 makes it free from vibration. Adjustment, therefore, is not necessary on account of wear during its life. Furthermore, it will be seen that in my construction the rear end of the valve casing is directly connected to the short rod 18 which is in alinement with the axis of the valve casing and that the valve 31 is in direct alinement with the rod 18 and is positively and directly connected to the brake rod 10, which is in alinement with the rod 18. This construction eliminates working parts and secures simplicity so that the structure is trouble-free and wear is largely eliminated. This direct connection between the parts and this alinement of these parts is highly important in that the linkage which I have illustrated stays permanent after installation. Brake shoes and brake lining wear rapidly and, therefore, all possible wear should be eliminated in the mounting of the valve in order to secure best results and to secure proper application of the brake.

It will also be noted that in my construction air is admitted to destroy the vacuum in the left hand end of the power cylinder when the foot pedal is returned to its released position. In this type of mechanism the vacuum caused by the engine behind the butterfly valve is transmitted to the opposite end of the power cylinder 8. In this type of mechanism only one hose 7 is necessary to be used, thus greatly simplifying the construction over those brake systems in which opposite ends of the power cylinder are evacuated alternately to first cause the movement of the piston to a brake applying position and then cause the movement of the piston to the brake released position. In such case as the last, a double vacuum line must be used. In my construction only a single hose 7 is used and this serves both in applying and releasing the brake.

Inasmuch as I do not use any other type of brake rigging except what is standard equipment on all model trucks and cars, I have not illustrated any brake rigging. My valve is adaptable to any and all mechanical or hydraulic standard brake rigging.

What is claimed is:

1. A controlling valve for pneumatic brakes, including a valve casing having a longitudinally extending valve chamber, the casing having a vacuum port and a cylinder port both disposed in the same transverse plane, the casing also having an air inlet port forward of the vacuum and cylinder ports and a port opposed thereto and communicating with the cylinder port, a hollow piston valve constituting a closed lubricant containing chamber longitudinally movable within and fitting the chamber, the forward portion of the valve having an exterior circumferential passage formed and arranged to normally connect the air inlet port with the port opposed thereto, the periphery of the valve forward of the passage having a circumferentially extending lubricating groove and the rear portion of the valve having circumferential lubricant grooves and the valve having a port leading from the interior to the exterior thereof for passage of lubricant therefrom, and a spring disposed within the forward end of the chamber bearing against and urging the piston valve rearward into its normal position with the piston valve closing communication between the vacuum and cylinder ports and the passage in the valve communicatively connecting the air inlet port with the cylinder port, the forward movement of the piston against the action of the spring acting to open the vacuum and cylinder ports and close the air inlet port.

2. A controlling valve for pneumatic brakes, including a valve casing having a longitudinally extending valve chamber, the casing having a vacuum port and a cylinder port both disposed in the same transverse plane, the casing also having an air inlet port forward of the vacuum and cylinder ports and a port opposed thereto and communicating with the cylinder port, a hollow piston valve constituting a closed lubricant containing chamber longitudinally movable within and fitting the chamber, the forward portion of the valve having a circumferential passage formed and arranged to normally connect the air inlet port with the port opposed thereto, the periphery of the valve having circumferentially extending lubricating grooves and the valve having ports leading from the interior to the exterior of the valve whereby lubricant is carried onto the surface thereof and into said grooves, a spring disposed within the forward end of the chamber bearing against and urging the piston valve rearward into its normal position with the piston valve closing communication between the vacuum and cylinder ports and the passage in the valve communicatively connecting the air inlet port with the cylinder port, the forward movement of the piston against the action of the spring acting to open the vacuum and cylinder ports and close the air inlet port, and a collar mounted upon said stem and bearing against the forward end of the valve casing when the piston valve is in its normal position and limiting the rearward movement of the piston valve under the action of the spring, the piston valve at one end having a plug to retain lubricant within the piston valve.

HARLEY C. MACK.